July 17, 1956 — E. L. BISHOP — 2,754,886

TIRE BUILDING APPARATUS

Filed Sept. 29, 1953 — 12 Sheets-Sheet 1

INVENTOR.
EARL L. BISHOP
BY W. A. Fraser
ATTY.

July 17, 1956  E. L. BISHOP  2,754,886
TIRE BUILDING APPARATUS
Filed Sept. 29, 1953  12 Sheets—Sheet 4

INVENTOR.
EARL L. BISHOP
BY
W. A. Fraser
ATTY.

July 17, 1956 E. L. BISHOP 2,754,886
TIRE BUILDING APPARATUS
Filed Sept. 29, 1953 12 Sheets-Sheet 5

INVENTOR.
EARL L. BISHOP
BY
W. A. Fraser
ATTY.

July 17, 1956  E. L. BISHOP  2,754,886
TIRE BUILDING APPARATUS
Filed Sept. 29, 1953  12 Sheets-Sheet 7

INVENTOR.
EARL L. BISHOP
BY
W. A. Fraser
ATTY.

July 17, 1956     E. L. BISHOP     2,754,886
TIRE BUILDING APPARATUS
Filed Sept. 29, 1953     12 Sheets-Sheet 8

INVENTOR.
EARL L. BISHOP
BY
W. A. Fraser
ATTY.

July 17, 1956     E. L. BISHOP     2,754,886
TIRE BUILDING APPARATUS
Filed Sept. 29, 1953     12 Sheets-Sheet 9

INVENTOR.
EARL L. BISHOP
BY
W. A. Fraser
ATTY.

July 17, 1956

E. L. BISHOP 2,754,886

TIRE BUILDING APPARATUS

Filed Sept. 29, 1953

INVENTOR.
EARL L. BISHOP
BY
W. A. Fraser
ATTY.

July 17, 1956 — E. L. BISHOP — 2,754,886
TIRE BUILDING APPARATUS
Filed Sept. 29, 1953 — 12 Sheets-Sheet 11

INVENTOR.
EARL L. BISHOP
BY W. A. Fraser
ATTY.

July 17, 1956

E. L. BISHOP 2,754,886

TIRE BUILDING APPARATUS

Filed Sept. 29, 1953

INVENTOR.
EARL L. BISHOP

BY
W. A. Fraser

ATTY 2,754,886

TIRE BUILDING APPARATUS

Earl L. Bishop, Cuyahoga Falls, Ohio, assignor to The Firestone Tire & Rubber Company, Akron, Ohio, a corporation of Ohio Application September 29, 1953, Serial No. 383,107

4 Claims. (Cl. 154—9)

This invention relates to tire building and tire building machines and more particularly to a tire building machine in which the operations of turning and stitching the ply ends around the beads are performed automatically.

The accepted commercial method of assembling tires is as follows. A plurality of plies of rubberized fabric are laid upon a building drum, and the ends of the plies which extend axially beyond the drum are turned radially inwardly to lie against the outer shoulders of the drum. The tire beads are set against the inturned plies and the inturned ply portions are pulled out and turned up and around the beads. Further plies are laid on the drum and their edges are turned down around the bead to overlap the plies previously turned up. The beads are thus anchored firmly within the body of the tire. Additional beads may be similarly embedded in the tire. The tread stock, chafer strips, etc. are then applied and the tire carcass is removed from the drum ready for molding and vulcanizing.

The pulling out of the inturned plies about the beads has heretofore been done by hand, with the operator grasping the plies and pulling them out progressively while slowly rotating the building drum to bring successive portions of the plies within reach. In light truck tires and passenger tires, the plies are narrow, light, and few in number so that the operator ordinarily experiences little difficulty in performing this operation. When larger, heavier tires such as truck tires, are built, the operator must handle more plies at one time, and the plies are greater in width and of heavier stock. The difficulties of pulling out the plies are magnified many times over, and the operation is much more laborious and costly in time and labor. A large fraction of the time of assembling heavy truck tires is consumed by this operation. In fact, some desired tire constructions have been avoided because the building of such tires is beyond the manual strength of a workman.

The present invention is directed particularly to the solution of this problem of turning the plies around the beads. Apparatus embodying the invention comprises essentially a pair of circular plates, one for each end of the drum, which have axial movement relative to the building drum. The plates are initially positioned within the drum, inside the radial plane of the inturned plies. After the beads are set and while they are held in place by novel means, the circular plates are pulled axially outwardly to take positions immediately beneath the beads. In taking this position, the plates pull the plies outwardly into cylindrical form coaxial with the drum. A stitcher is then moved inwardly of each of the pulled-out plies and brought outwardly in a movement to force the plies outwardly around the beads. Thereafter, additional plies are turned under the beads. All of these operations of turning the plies are done without manual effort on the part of a workman. The invention has the features of holding the beads firmly without any chance of their being displaced while the plies are pulled out and the pullout plates, in addition to their primary function of pulling the plies outwardly around the beads, serve the purpose of guiding the stitchers in their most effective stitching movement. By means of the invention, the cost of building a tire in time and money is reduced and sounder tires of better quality are produced.

The primary object of the invention therefore is to provide means for building tires of heavy construction in which the operations of turning the plies of the tire around the beads are performed automatically without hand labor.

Another object is to provide a tire building machine capable of handling a greater number of plies at one time in the operation of turning said plies around the beads, particularly plies of heavy and stiff construction such as plies having wire fabric.

Another object is to provide a method and means for building tires which eliminates much of the need for skilled labor.

Another object is to provide apparatus for building tires which will reduce the time and expense of building the tires by economy of time and labor.

Another object is to provide apparatus which will produce tires of better quality with a stronger bead construction and with less wrinkling of the tire plies.

A more specific object is to provide apparatus having means for pulling out the plies automatically under and around the beads.

Another object is to provide means to guide the stitchers in the ply turn-up operations, in which the pulled out plies are turned up around the beads, the guiding of the stitchers resulting in improved stitching and stronger bead constructions.

Yet another object is to provide an apparatus which will control and minimize the wrinkling which results from the turn-in of the plies.

These and other objects and advantages will be more fully apparent from the following description of a preferred form of the invention, reference being had to the accompanying drawings in which.

*The operation in general*

The operation of apparatus embodying the invention is illustrated somewhat diagrammatically in Figures 1 to 7 inclusive. In these sketches only enough of the apparatus is shown to illustrate the method of the invention and the construction and manner of operation of the preferred form of apparatus. No effort is made to show the details of construction in these figures.

Figure 1:
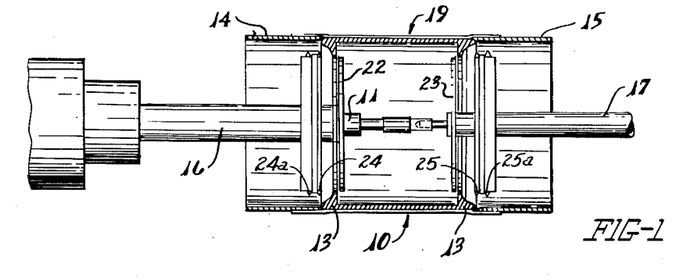
Figures 1–7 inclusive are diagrammatic views of a building drum, in section, together with apparatus embodying the invention, the figures showing the successive steps in the building of tires and illustrating particularly the features of the invention which are operative in each of the steps.

As shown in Figure 1, apparatus embodying the invention is used in connection with a collapsible tire building drum 10, the drum being mounted on a shaft 11 which is driven by a suitable drive means, not shown. The drum 10 is of conventional construction having the usual recessed shoulders 13 at each end of the drum. Ply rings 14 and 15 are adapted to be brought into close proximity with the drum at various steps of the building operation in a manner well known in the art. The details of the mounting of the ply rings will be described later. All that need be noted at this time is that the ply ring 14 is mounted for idling rotation on tubular support 16 surrounding shaft 11 and the ply ring 15 is similarly mounted on an auxiliary support 17.

In the first building step, see Figure 1, the ply rings 14 and 15 are positioned immediately adjacent to the drum so that they act as extensions of the drum turning with the drum as it rotates. A plurality of plies 19 are laid upon the drum and the ply rings in the usual manner, and are stitched together by suitable stitching means. The plies extend beyond the drum to lie upon the ply rings.

Figure 2:
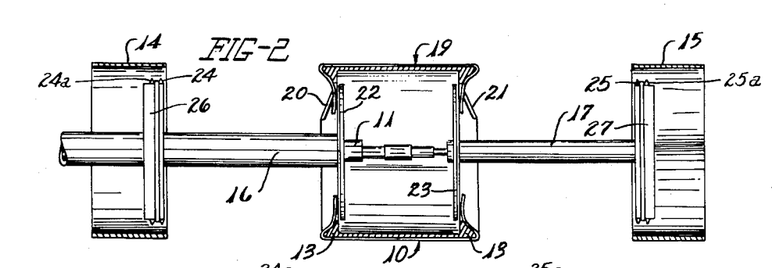

In the next step, Figure 2, the ply rings 14 and 15 are withdrawn to their outer positions and the portions of the plies which extend beyond the edges of the drum are turned inwardly over the shoulders 13 of the drum to the position shown. This turning of the plies may be done by hand or by stitchers 20 and 21 which will be described later.

It will be noted that the support 16 also carries a circular plate 22 referred to hereafter as a pullout plate and that a similar plate 23 is carried by the support or shaft 17. In the positions of Figures 1 and 2 these pullout plates are well inside the shoulders of the drum so that they will be inside of the inwardly turned plies.

Figure 3:
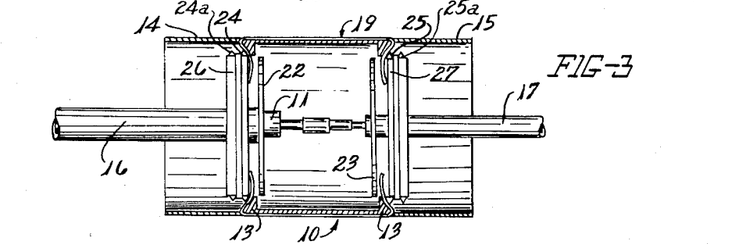

In the next step, see Figure 3, beads 24 and 25, carried by bead holding rings 26 and 27, are seated firmly against the inturned plies and against the shoulders 13 of the drum. These bead rings 26 and 27 are normally positioned just outside the building drum, as in Figure 1, but are capable of longitudinal movement along the supports 16 and 17 respectively, to carry the beads into place against the shoulders of the drum.

Figure 4:
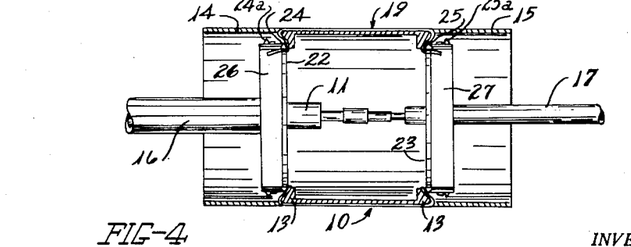

After the beads are set in place, the bead rings are pulled back from the drum, are expanded to a slightly greater diameter, in a manner to be described later, and then brought against the sides of the beads to hold the beads firmly in place against the shoulders of the drum, see Figure 4. While the beads are thus held in place, the pullout plates 22 and 23 are pulled outwardly to positions immediately under the beads, see Figure 4, and, in making this movement, the plates force the inturned portions of the plies axially outwardly to the position shown, with the plies extending under the beads and protruding outwardly from the beads in an axial direction.

Figure 5:
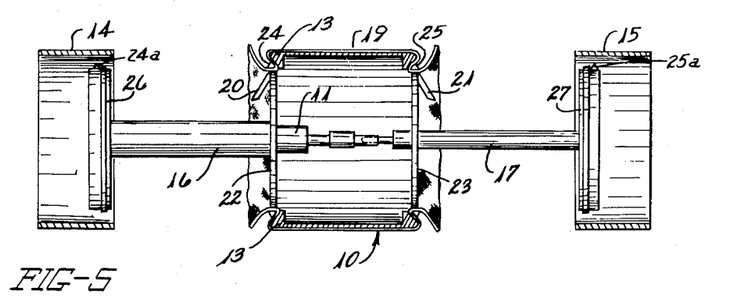

In the next step, see Figure 5, the bead holding rings 26 and 27 are withdrawn outwardly away from the drum and stitchers 20 and 21 are brought around the outturned plies into contact with the plates 22 and 23 to begin a stitching operation which will turn the plies radially outwardly around the beads. In Figure 5 the stitchers are shown just as they strike the pullout plates and start their radial outward movement toward the beads. The pullout plates in their position beneath the beads, act as a stop and a guide for the stitchers, and thus direct the stitchers onto the beads in a manner to produce the most effective stitching. This feature of guiding the stitchers onto the beads gives a reliability and uniformity of stitching which cannot be obtained in any other manner. As will be noted later, the stitchers have resilient means permitting them to bear forcibly against the pullout plates without damage to the plates or stitchers. After the stitchers leave the plates, they ride up over and radially outwardly beyond the beads embedding the beads securely within the looped plies.

Figure 6:
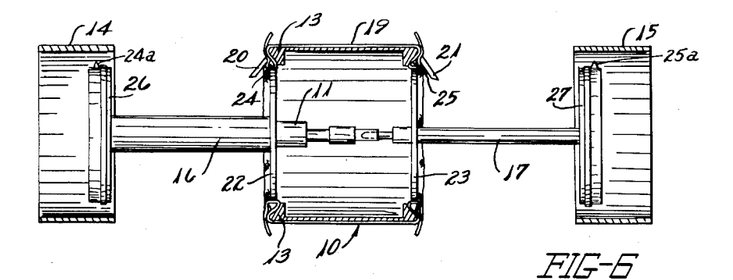

Figure 6 shows the stitchers just after they strike the shoulders of the bead and start to move radially outwardly around the beads. To complete this operation, the plies are turned backwardly upon the cylindrically outer surface of the drum either by stitchers as shown, or by hand, see Figure 7.

The above general outline of the operation and function of a preferred form of the invention will, it is believed, aid in understanding the following detailed description of the construction and operation of the apparatus.

It will be understood that the invention is described in connection with a conventional building drum 10 which is supported and driven by a drive means at the left of the operator as he faces the building drum. For convenience, the left end of the drum will hereafter be referred to as the inboard end; the right end or free end will be referred to as the outboard or turret end. The apparatus differs in construction at the inboard and outboard ends of the tire building drum because of the necessity of adapting the inboard apparatus to the cantilever drum supporting and driving mechanism. The principles of operation and the results obtained by the inboard and outboard portions of the apparatus are, however, otherwise identical. For convenience, the outboard or right hand portion of the apparatus will be described first.

Figures 8, 9:
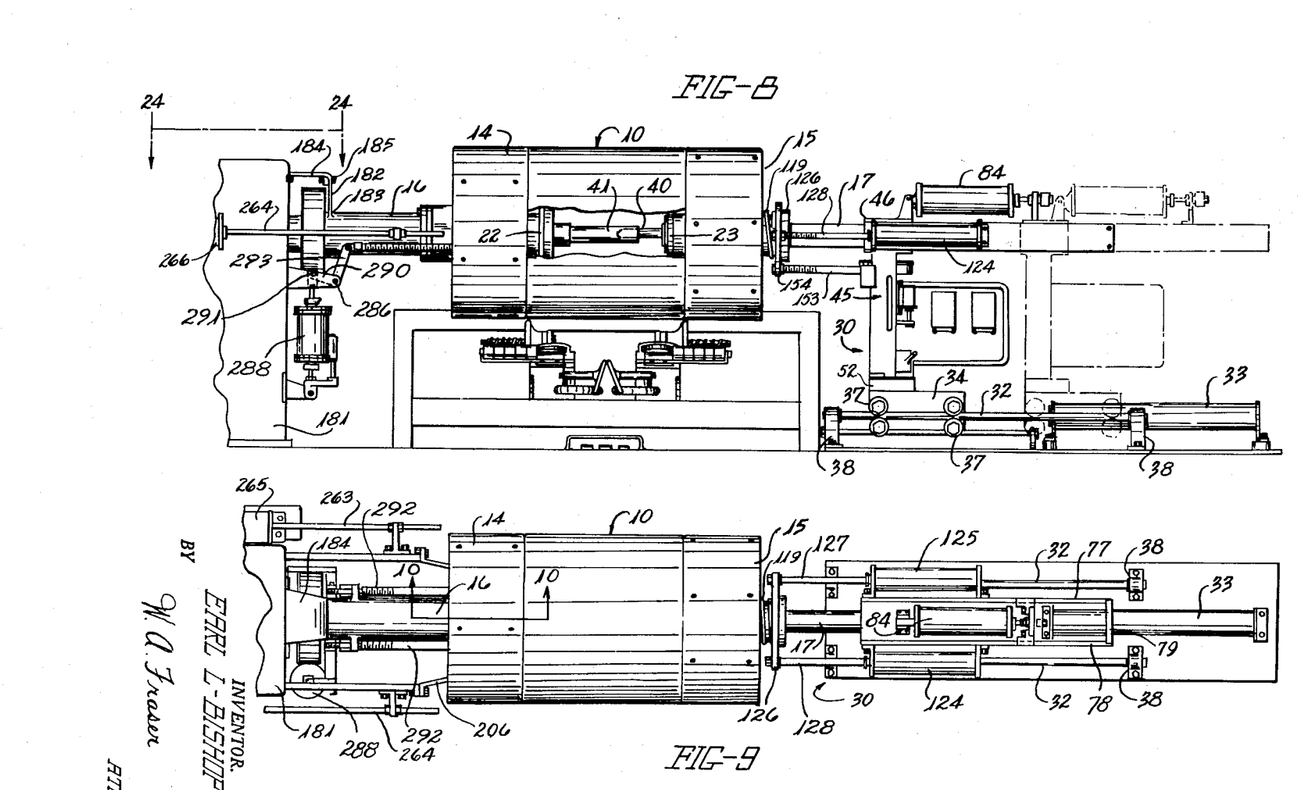
Figure 8 is a front elevation of a tire building machine showing a tire building drum and associated apparatus embodying the present invention.
Figure 9 is a top plan view of the apparatus of Figure 8.
Figure 21:
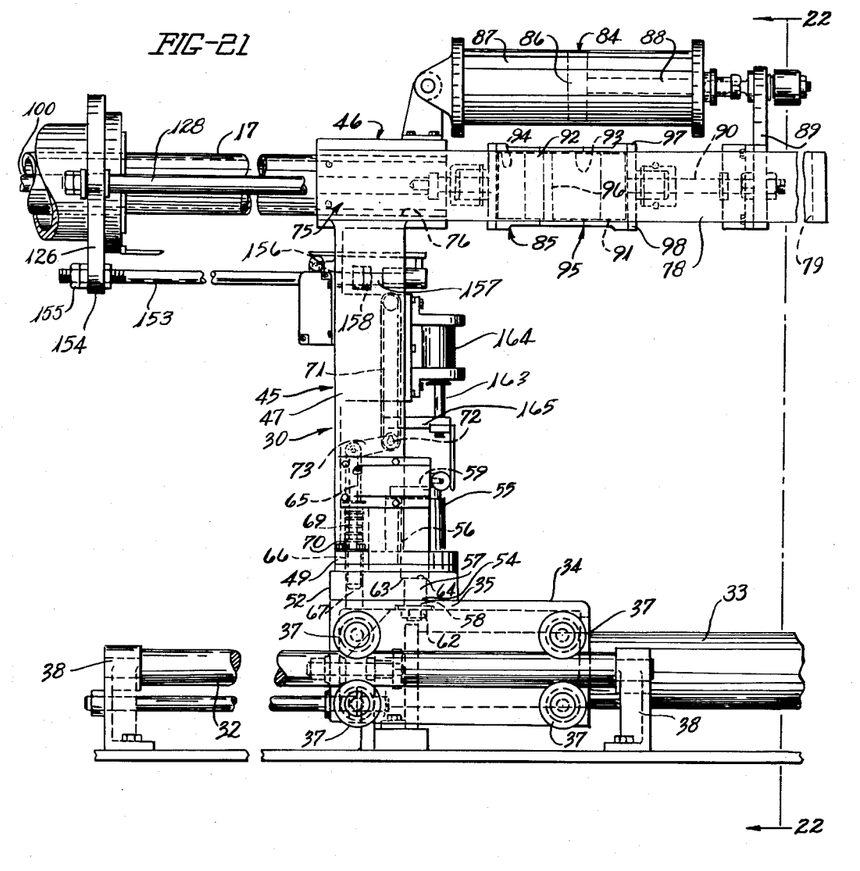
Figure 21 is a side elevation showing the construction of the carriage on which the outboard portion of the apparatus is mounted.

As mentioned above, the ply ring 15, the pullout plate 23 and the bead setting ring 27 are all supported by an outboard support or shaft 17 which is mounted on a carriage indicated generally at 30, best shown in Figures 8 and 21. The carriage is moved in an axial direction toward and away from the drum along rails 32 by means of a carriage positioning pneumatic motor 33. The construction of the carriage is such that the support 17 and the associated parts of the apparatus which are mounted on the support may be pivoted bodily as a unit about a vertical axis when the carriage is in its fully retracted position. The combined retracting and pivoting movements of the carriage provide clearance to permit a tire to be removed from the drum after the building of the tire is complete.

The construction of the outboard turret carriage

Figure 22:
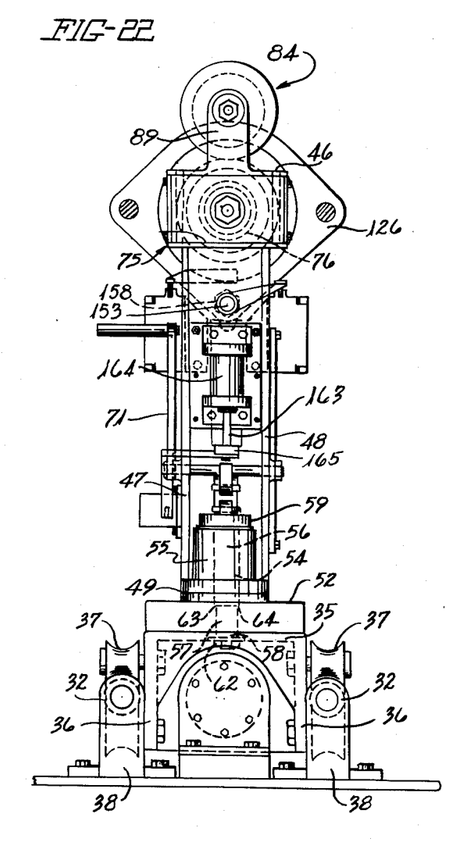
Figure 22 is an end elevation of the carriage of Figure 21.

While the carriage 30 may take any one of a number of suitable constructions, that illustrated in Figures 21 and 22 is preferred. As shown, the base of the carriage comprises a channel-shaped structural member 34 having a horizontal plate 35 and vertical side plates 36 from which rollers 37 are journalled in pairs, as shown. The rollers are concave in section so that they will closely engage the rails 32 which are heavy round rods supported by suitable stands 38. The pairs of rollers are spaced horizontally along the rails a substantial distance as shown in Figure 21 and the individual rollers of each pair embrace the rails 32 between them, see Figure 22. This construction braces the carriage against the cantilever supported weight of the various operating parts of the carriage and provides a true and accurate movement of the carriage toward and away from the building drum. However, to ensure a final accuracy of position with respect to the drum, the tubular support 17 is provided with a pilot 40 of reduced diameter which fits snugly within a socket 41 in the building drum when the carriage 30 is in its operative position adjacent the drum 10, see Figure 8. The pilot, when seated in the socket, aligns the tubular support shaft 17 and the parts carried thereby coaxially with the building drum.

The turret portion of the carriage 30 comprises an upright column, indicated generally at 45, which supports an operating head 46. The column 45 comprises two spaced vertical plates 47 and 48 which are secured to and rise upwardly from a base plate 49. The plates are held rigid by suitable tie bolts as well as by attachment to the base plate 49 and the head 46. The column 45 is secured for pivoting movement to the base of the turret by the arrangement shown in Figure 21 which comprises a plate 52, secured to the plate 35, and providing a bearing surface for the bottom of base plate 49. The two plates 49 and 52 are held together, and the column of the turret is thereby secured to the base, by a large bolt 54 which passes through a sleeve 55 secured to the plate 49, through a hole 56 in plate 49 and through similar holes 57 and 58 in plates 52 and 35 respectively. The head 59 of the bolt engages the end face of the sleeve 55 and the nut 62 draws the bolt and hence the turret down into contact with the bearing plate 52. In order to prevent drawing the parts together so tightly as to lock them together and prevent the desired ease of pivoting of the turret, the bolt has a shoulder 63 adapted to engage a shoulder 64 in the bearing plate 52. The length of the bolt is such that when these two shoulders abut, the turret has the desired frictional contact with the base.

In order to prevent accidental turning of the turret, a locking mechanism is provided as shown in Figure 21, comprises a pin 65 which is adapted to slide within drilled holes 66 and 67 in the turret base plate 49 and the bearing plate 52 respectively. A coil spring 69 confined between a fixed abutment on the column and a shoulder 70 on the pin 65 normally urges the pin downward into the bearing plate 52 so that when the carriage is in operating position the turret will be locked against pivoting movement. When the carriage is fully retracted the operator can free the turret from the locking or detent pin 65 by rotating a hand crank 71 clockwise as viewed in Figure 21. Rotation of the crank turns the pin 72 which is journalled between the vertical plates of the column and turns the link arm 73 which is fixed to the pin 72. The arm 73 lifts the detent pin 65 out of the plate 52 and the turret is released to swing free under manual pressure from the operator.

In order to position the turret properly a stop may be secured to the base in a position to block the counterclockwise swinging of the turret beyond the position of axial alignment with the building drum and to locate the hole 67 into alignment with the locking pin 65.

The head 46 comprises a block 75 having a bore 76 adapted to receive and support the tubular shaft 17. Two parallel plates 77 and 78 extend outwardly to the right from the bore and are jointed at their ends by the end member 79. The block and the plates support two pneumatic motors which control the movement of the pullout plate 23 as will be described in the following sections.

The outboard ply pullout plate

The outboard pullout plate 23 is mounted on the shaft 17 in a manner which permits it to be moved successively to the positions of Figures 1 to 7 and which also permits it to have free idling rotation. The freedom of the plate to rotate, while perhaps not strictly necessary, is sometimes advantageous in the operation of the plate. These two motions of the plate are obtained by mounting the plate for rotation on a collar 80 which is free to slide axially along the shaft 17. The bearing construction indicated at 81 permits the desired idling rotation between the hub 82 of the plate and the collar 80, while the bearing indicated at 83 permits axial sliding movement of the collar along the shaft 17, see Figure 12.

Figures 18, 19:
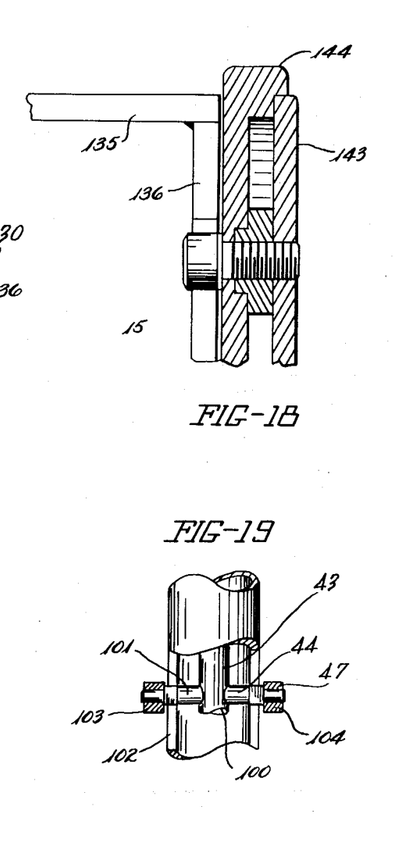
Figure 18 is a fragmentary sectional view of the bead setting ring of Figure 15, the view being taken in the plane indicated by the line 18—18 of Figure 15.
Figure 19 is a fragmentary view, partly in section, showing the manner in which the ply pullout plate of Figure 12 is connected to its positioning motors.

The pullout plate 23 and collar 80 are moved axially along the shaft support 17 by a pair of positioning pneumatic cylinders or motors 84 and 85 which are connected to the collar 80 by a rod 100 which extends through the tube 17. The connection of the rod 100 to collar 80, see also Figure 19, comprises a pin 101 which extends transversely through the rod and through the pair of slots 102 on each side of the shaft 17, the pin being secured to a pair of lugs 103 and 104 which are integral with the collar 80. The slots 102 permit the desired axial movement of the collar along the shaft 17 but restrain the pin 101 and hence the collar 80 against rotation on the shaft.

The positioning of the pullout plate

The two motors 84 and 85 which are mounted on the head 46 of the turret cooperate together to bring the ply pullout plate into the desired positions. The arrangement is such as to obtain the maximum number of predetermined positions for the pullout plate. For example, the plate should have an innermost position inside the drum (Figure 1), a position beneath the first bead (Figure 4), a position beneath a second bead, if the tire should require a double bead, and, finally, an outermost retracted position well away from the drum. The motors 84 and 85 accordingly have a construction and are arranged to act together to provide this positioning of the plate.

As best shown in Figure 21, the motor 84 is of conventional construction comprising a piston 86 operating in a cylinder 87 in response to the admission of air under pressure to the chambers on either side of the piston. A piston rod 88 connects the piston 86 to the motor 85 by means of a bracket 89 which is secured to one of the piston rods 90 of motor 85. The motor 85 differs from motor 84 by having a pair of pistons 91 and 92 operating in separate chambers 93 and 94 which are marked off in the motor cylinder 95 by a partition 96. The piston 92 is connected to the piston rod 100 which moves the pullout plate and piston 91 is connected to the piston rod 90 referred to above. The motor 85 has projecting flanges 97 and 98 which engage the plates 77 and 78 of the head. These flanges guide the motor 85 as it is moved bodily toward and away from the building drum by the motors 84 and 85 in the manner which will now be described.

Figure 28:
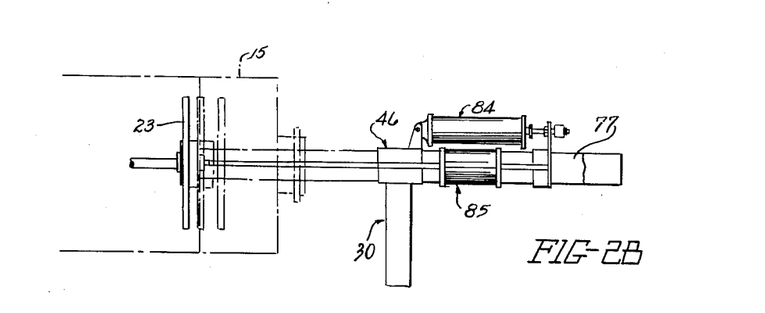
Figure 28 is a somewhat diagrammatic view illustrating the manner in which the outboard pullout plate is moved from its operative position under the bead of the tire to its position clear of the drum.
Figure 29:
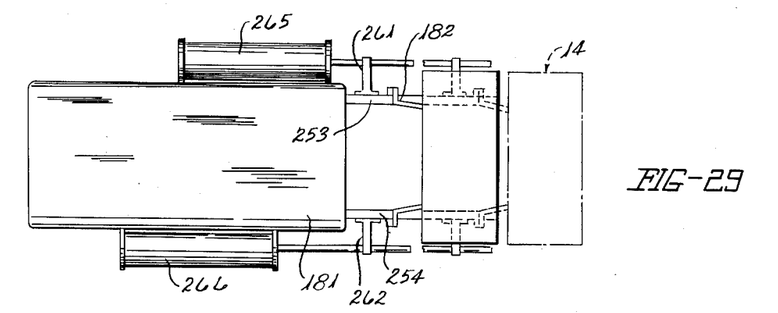
Figure 29 is a somewhat diagrammatic view, similar to Figure 24, illustrating the manner in which the inboard portion of the apparatus is moved into operating position adjacent the tire building drum.

In order to bring the pullout plate into its innermost position within the drum, see Figure 1, air is admitted to the right of the piston 86 in cylinder 87 to force the piston 86 all the way to the left. At the same time air is admitted to the chamber 93 at the left of piston 91 to hold the piston 91 full to the right against the force exerted on motor 85 by the motor 84. The result is that the motor 85 is moved bodily to the left along the ways or plates 77 and 78. Air is also admitted to chamber 94 to the right of piston 92 to force the piston and its piston rod 90 full to the left. With the motors 84 and 85 in this position the pullout plate is within the drum about 2 inches inside the position of the 1st bead, see Figure 2. After the bead is placed on the tire, air under pressure is withdrawn from the right of the piston 92 and admitted to the chamber 94 at the left of the piston. This change causes the piston rod 100 to move rightwardly the full stroke of piston 92, a distance of about 2 inches, see Figure 28, to bring the pullout plate into the position of Figure 4, see Figure 28. After the stitching of the plies about the bead is completed, the pullout plate is completely withdrawn by admitting air to cylinder 87 at the left of piston 86 moving the motor 85 bodily back to the right, and the pullout plate to the right dotted line position of Figure 28.

If a tire is built with a double bead the pullout plate is positioned under the second bead by admitting air to the right of piston 91 while air is exhausted from the left of piston 91. The motor 85 and hence the pullout plate is thereby moved axially outwardly from the drum by an amount equal to the stroke of piston 91, a distance which will bring the pullout plate under the second bead.

The outboard ply ring

Figures 12, 13:
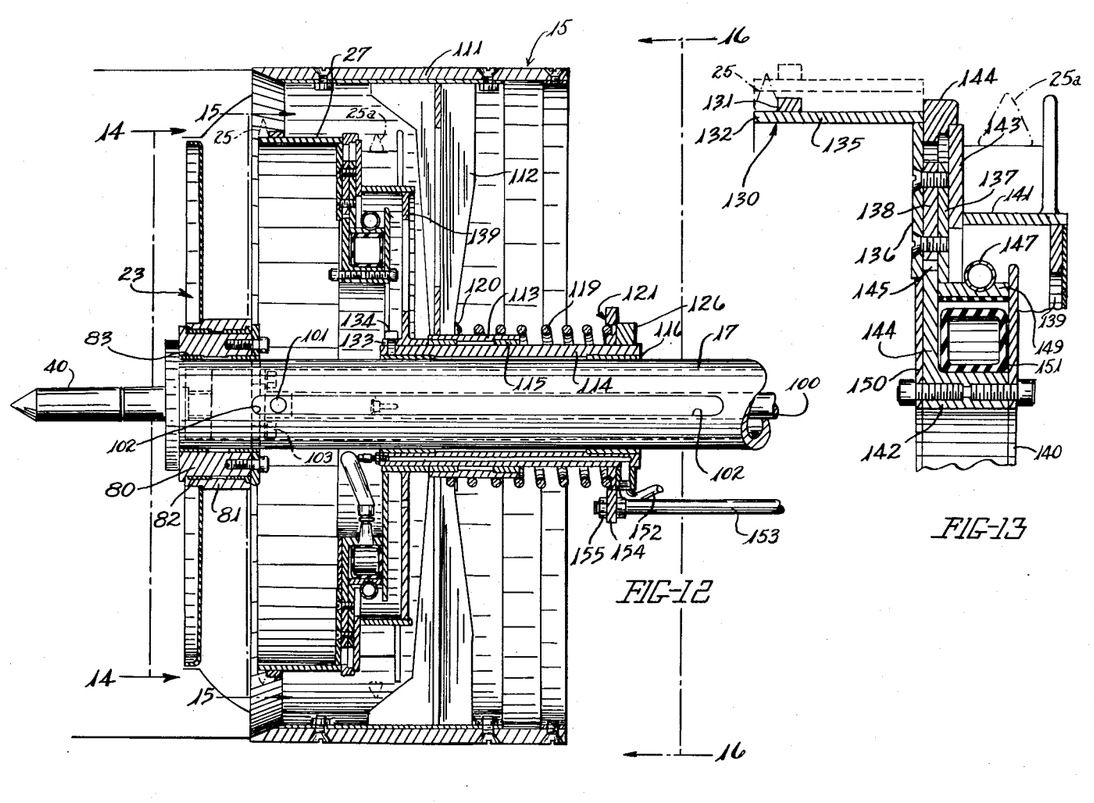
Figure 12 is a longitudinal sectional view, showing the right hand or outboard portion of the apparatus of Figure 9, the section being taken in the plane indicated by the line 12—12 in Figure 15 and being shown on a somewhat larger scale.
Figure 13 is a vertical sectional view of the bead setting ring of Figure 12 on a still larger scale.

The ply ring 15 which as noted above has the primary function of acting as an extension of the drum 10, consists of a cylindrical outer shell 111, having the same diameter as the drum, which is supported by a spider construction 112 secured to a hub member 113, see Figure 12. The hub is mounted for free idling rotation on a main sleeve member 114 by means of a bearing 115. The sleeve member itself is slidably mounted on the support or shaft 17 by a bearing construction 116 which permits a sliding movement of the hub along the sleeve. The ply ring is normally biased to take an extreme left-hand position against the bead ring, by a heavy coil spring 119 which is confined between the hub of the ply ring as at 120 and a radial surface 121 affixed to the main sleeve 114.

The ply ring and its supporting sleeve are moved into position adjacent the end of the drum by two pneumatic motors 124 and 125 lying along the plates 77 and 78 of the head of the carriage, see Figures 9 and 12. The motors act through a yoke 126 which is mounted on the sleeve 114 and which is connected to the motors by the piston rods 127 and 128. The force of the motors is transmitted to the ply ring by the yoke acting through the spring 119 which permits a yielding movement of the ply ring when it contacts the shoulder of the drum. This ability of the ply ring to yield against the force of the spring compensates for inaccuracies of construction and enables the ply ring to be brought against the building drum with substantially a constant force even though varying numbers of plies are turned over the shoulder during the building of a tire. Moreover, as will be seen below, the resilient mounting of the ply ring enables the same motors 124 and 125 to move the bead setting ring into operation.

The outboard bead setting ring

The bead ring 27, referred to above, serves two functions, (1) to set the beads against the shoulders of the drum, and (2) to hold the beads in place while the plies are pulled radially outwardly by the pullout plates. In order to perform these two functions, the bead ring 27 is made up of a plurality of radially adjustable segments 130 whose outer peripheral edges are recessed as indicated at 131 to receive the inner diameter of the beads and to hold the beads prior to and during the bead setting operation. The construction is such that the bead ring can be expanded by outward movement of the segments to a slightly greater circumference so that the peripheral edges 132 of the segments will engage the side of a bead when it is in position against the shoulder of the drum during the ply pullout operation, see Figures 3 and 4.

Figure 15:
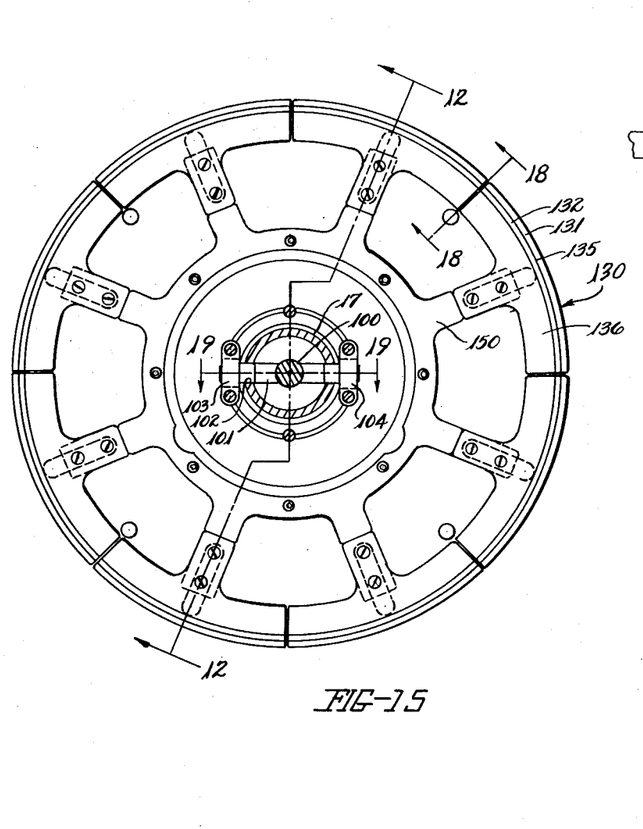
Figure 15 is a sectional view showing in end elevation, the bead setting ring of Figure 12, the section being taken in the plane indicated by the line 15—15 of Figure 12.

As shown in Figures 12 and 15, the bead ring segments are mounted on a hub portion 133 which is secured by screws 134 to the main sleeve 114 which, as noted above, also supports the ply ring and is movable along the shaft 17. As best shown in Figure 13, the segments 130 each have a partially cylindrical portion 135 and an inwardly radially extending portion consisting of a pair of radial plates 136 and 137 which are joined together by a spacer member 138 having a purpose to be described later.

The hub 133 is built up of radial and circumferential plates in the form of complete rings to produce a sub-assembly shown in Figure 12 and in a slightly larger scale in Figure 13. Thus, the radial plates 139 and 140 extend outwardly to support the angular sections 141 and 142 respectively which have parallel radially extending portions 143 and 144 adapted to receive the radial plates 136 and 137 of the segments in an intermeshing fashion as shown. With the segments and hub so assembled each of the spacer members 138 slides within corresponding slots 145 in the ring portions 144 and the spacer or slide members thus guide and restrict the segments in their radial movements. The slots 145 are slightly greater in width than the spacer or slide members and are enough longer than the members 138 to permit the desired radial movement of the segments.

The segments 130 are urged into fully-retracted position by a coil spring 147 which is partially seated within an annular channel defined by the plates 140 and 144 and by ring segments 149 which are secured to the plates 137 of the segments. The segments in this position have the diameter necessary to hold a tire bead in the notches 131. An abutment for the ends of plates 136 of the segments is provided by a stop ring 150 secured to the plate 144. The stop ring ensures that the segments will take their proper positions.

The segments are expanded radially outwardly to form a bead ring of maximum diameter so that the edges 132 of the segments will be able to contact and hold the side of the bead 25 as shown in Figure 3, by an inflatable rubber tube 151 which is positioned between the angular member 142, the plate 140 and the ring 149. When air under pressure is introduced into the tube 151, as by a suitable flexible conduit 152 which is connected to a source of air under pressure, the tube will expand and exert a radial outward force on the ring 149 overcoming the force of the spring 147 and moving the segments outward until the slide members 138 strike the ends of the slots 145. When the pressure is released from the tube 151, the spring 147 will return the segments to their original position.

The positioning of the outboard bead setting ring

The forward movement of the bead setting ring is controlled by a rod 153 secured to a lug 154 extending from the yoke 126. The rod 153 extends parallel to the piston rods 127 and 128 of the motors 124 and 125 and extends to the right away from the building drum to pass through a plate 156 secured to the plates 47 and 48, see Figures 21 and 22. The right end of the rod has a threaded portion 157.

When the bead-setting ring is to be held out of position away from the drum, as in Figures 1 and 2, and 5–7, provision is made to shorten the forward stroke of the bead-setting ring. This is accomplished by temporarily inserting a buffer block 161 to the left of the nuts 158 on the rod and the stop plate. Since the motors 124 and 125 are air cylinders, a stop of this nature is effective for the air acting on the pistons within the cylinders merely compresses until its pressure builds up to the source pressure. The length of rod extending between the yoke and the enlarged end is such as to permit the bead-setting ring to "set" the tire bead against the plies of the tire with the required force.

Figure 23:
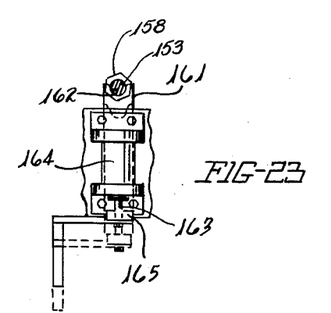
Figure 23 shows in elevation, on a somewhat enlarged scale, the stop mechanism which controls the position of the bead setting ring of Figure 12.

The block has a semi-cylindrical groove 162 which enables the block to fit about the rod, see Figure 23. Normally the block takes a position against the rod in the path of travel of the end 157, but when a bead is to be set, the block is pulled downwardly by the piston rod 163 of a pneumatic cylinder 164 acting through a connecting member 165 which is secured to the buffer block and the piston rod 163 as shown. Necessarily the width of the block is such as to shorten the stroke of the bead ring and hold it clear of the building drum by the required amount.

The switches, valves, pneumatic and electrical circuits, limit switches and controls needed to complete the construction and to facilitate the operation of the outboard portion of the apparatus, described above, indicated in Figure 8, but are not shown in detail for they are conventional and well known to those skilled in the art. Similar parts and circuits are used with the inboard portion of the apparatus and with the building drum, stitchers and the like and for similar reasons will not be described.

The inboard portion of the apparatus

Before discussing the inboard portion of the apparatus in detail, the drive for the tire building drum 10 will be described for it provides support for the apparatus and prescribes the spatial limits of the mechanism. It will be observed from Figure 10 that the drum 10 is supported and driven from an inner shaft 177 which is connected to the drum and by a clutch to a drive unit (not shown) within the housing 181. A tube 179 surrounding the shaft 177 is connected to the drum and also to a brake mechanism adjacent the housing. This construction is conventional and well known to those skilled in the art. The provision of the tube 179 permits the brake to be applied in a manner to collapse the building drum when desired.

The inboard portion of the apparatus as noted above has parts corresponding exactly in purpose and function to the parts described above with respect to the outboard or turret portion of the tire building machine. All of these parts are mounted on and are at least partially supported by the tubular support 16. The tubular support 16 in turn is partially supported from the frame or housing 181 by an angular bracket 182 welded to the tubular support as at 183 and connected to a complementary bracket 184 of the housing by a bolt 185, as shown in Figure 8. The tubular support extends from the frame 181 to a point just inside the shoulder of the building drum 10, terminating in a bearing construction indicated at 186 in Figure 10, by which the cantilever end of the tube is supported on the tube 179. It will be noted that this construction permits the drive shaft and tube 179 to rotate freely within the tubular support 16.

The pullout plate 22 is mounted on a large sleeve member 187 which has sliding movement along the tubular support 16. The sleeve member has a hub portion 188 affixed to the sleeve in any suitable manner and comprising the spaced flanges 189 and 190 and the bearing ring 191 which provides bearing support for the pullout plate which has idling rotation between the flanges 189 and 190 during the operation of the apparatus. It will be noted that the sleeve 187, while capable of axial sliding movement on the tube 16, is held against rotation by a key construction indicated at 194, at the bottom of the tube and the sleeve. The description of the manner in which the pullout plate is moved to its various positions will be deferred until the bead setting ring is described.

The inboard ply ring and bead setting ring

As mentioned above the ply ring 14 and bead setting ring 26 are mounted together in a manner which permits the ply ring to rotate with the drum during the operation illustrated in Figure 1 while the bead setting ring is held against rotation. The mounting also permits relative axial movement between the ply ring and the bead setting ring so that the bead 24 can be set against the tire as shown in Figure 3. These results are obtained by mounting the ply ring for rotation on a bearing 203 which is fixed to the bead setting ring and by giving the ply ring a telescoping axial movement with respect to the bearing.

Figures 10, 11:
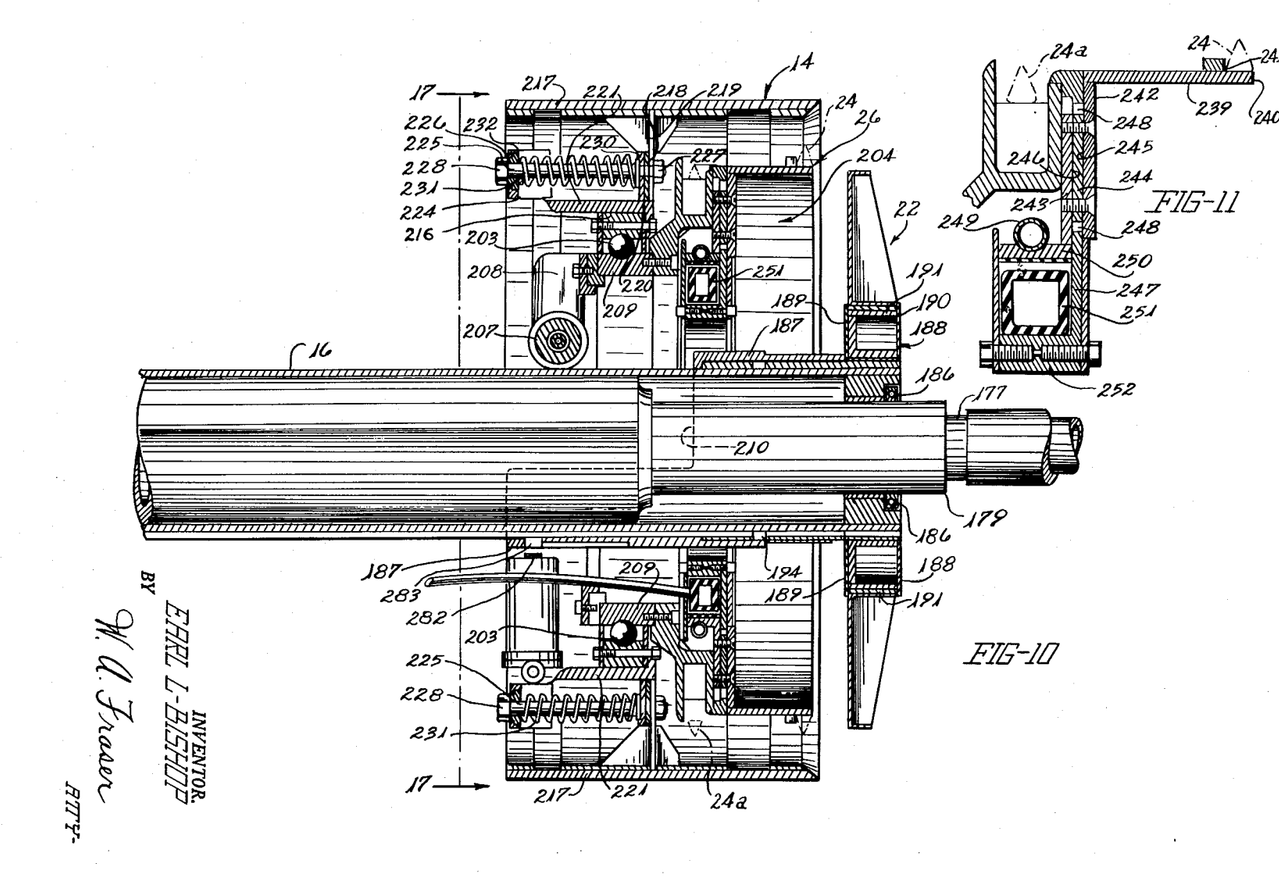
Figure 10 is a longitudinal vertical section showing the left hand portion of the apparatus of Figure 9 the section being taken in the plane indicated by the line 10—10 in Figure 9 and being shown on a somewhat larger scale.
Figure 11 is a longitudinal vertical section of a portion of the apparatus of Figure 10 on a still larger scale showing the bead setting ring.

Thus, the bead setting ring 26 comprises an assembly made up of a plurality of ring members indicated generally at 204 which are assembled to form a structure having a section as shown in Figure 10. This bead setting ring assembly is supported by a pair of axially extending cantilever supporting members 206 which are supported in a manner to be described later. Additional support is given to the assembly by means of a roller member 207 suspended by a bracket 208 from the ring 209 of bearing 203 to rest upon the upper surface of the main tubular support 16, the sleeve 187 being cut away as at 210 to permit the roller to make contact with the support. The face of the roller member is concave so as to conform to the upper surface of the tube, see Figure 17, and the roller is freely journalled so that the bead setting ring can be moved axially with respect to the tube.

One of the main structural elements of the bead setting ring is the ring 209 which comprises the lower race of the roller bearing 203. For the purposes of this discussion, the upper race 216 of the bearing and the structure outwardly of the upper race is considered to be ply ring structure. The ply ring 14 comprises the cylindrical portion 217 and a hub 218 connected to the cylindrical portion by the supporting member 219. The hub has an internal cylindrical bore 220 which has bearing contact with the outer surface of a ring 221 secured to the upper race. The hub is held for restricted axial movement on the ring 221 by means of six lugs 224 which are integral extensions of the ring 221 and by long bolts 225 which extend through holes in the hub and axially through bores 226 in the lug members. Each of the bolts are threaded at their ends to receive nuts 227 and 228 respectively. For each section, the nut 227 draws the bolt to the right pulling a flange 230 into abutment with the hub and thereby clamping the bolt firmly to the hub. The nut 228 is adapted to abut the end face of lug 224 and restrict the rightward movement of the bolt and hence restrict the rightward movement of the hub on ring 221. The movement of the hub to the left takes place against the force of coil springs 231 placed about the bolts 225 and confined between the clamping flanges 230 and flange 232 on the lug members.

The ply ring 14 is brought to the position of Figure 1, by moving the bead setting ring 26 rightwardly which movement carries the ply ring into abutment with the left end of the tire building drum. At this time, the bead setting ring will continue to move slightly forwardly, that is to the right, with respect to the ply ring, but such forward movement is limited so that the bead is held out of contact with the tire building drum. Later, when it is desired to set the beads upon the partially assembled tire, as in Figure 3, the bead setting ring 26 is carried forwardly toward the drum with the coil springs 231 undergoing compression until the bead is brought firmly into contact with the tire.

The inboard bead setting ring construction

The bead setting ring 26 like the bead setting ring 27 is made up of a plurality of partially cylindrical segments 239 whose edges 240 are notched as indicated at 241 to receive and hold the beads of the tire. Normally the segments 239 have a retracted position as shown in Figure 10, in which the diameter of the ring at the edge is substantially equal to that of the tire bead. However, the segments can be expanded radially outwardly so that their edges will have a greater diameter enabling them to contact the sides of the beads and hold them in place during the ply pullout operation, see Figure 4. The construction which makes the expansion of the segments possible is similar to that described above with respect to the outboard bead ring 27. Thus each segment comprises two angular parts 242 and 243, as best shown in Figure 11, which are connected by a slide member 244. The radial faces 245 and 246 of the two parts embrace a radial plate 247 and the slide member is positioned within a slot 248 in the radial plate.

Normally the segments take their innermost retracted position in response to the force exerted by a coil spring 249 which encircles a circumferential flange 250 of part 243. The expanding movement of the bead setting ring against the force of the spring 249 is produced by an inflatable rubber tube 251 similar to the tube already described for the outboard portion, the tube being confined within the angular ring part 252, the cylindrical flange 250 of the angle member and the radial plate 247. When air under pressure is admitted to the tube, the tube will expand outwardly and force the segments to their radially outermost position which is fixed by the abutment of the slide members 244 with the ends of the slots 248. When air is released from tube 251 the spring 249 once again returns the segments to their inward positions.

The positioning of the inboard parts

Figure 24:
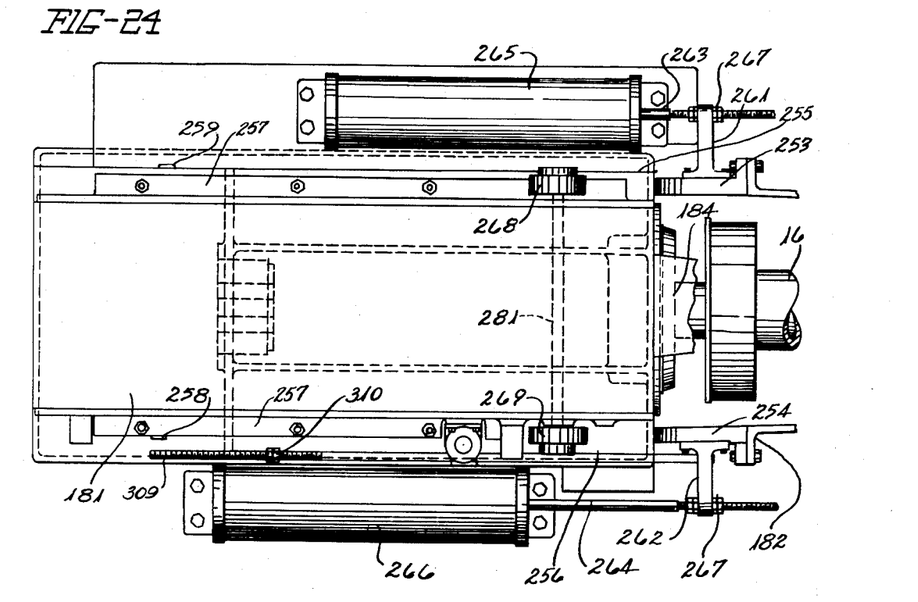
Figure 24 is a top plan view showing the means for positioning the ply ring and bead-setting ring of the inboard portion of the apparatus.
Figure 25:
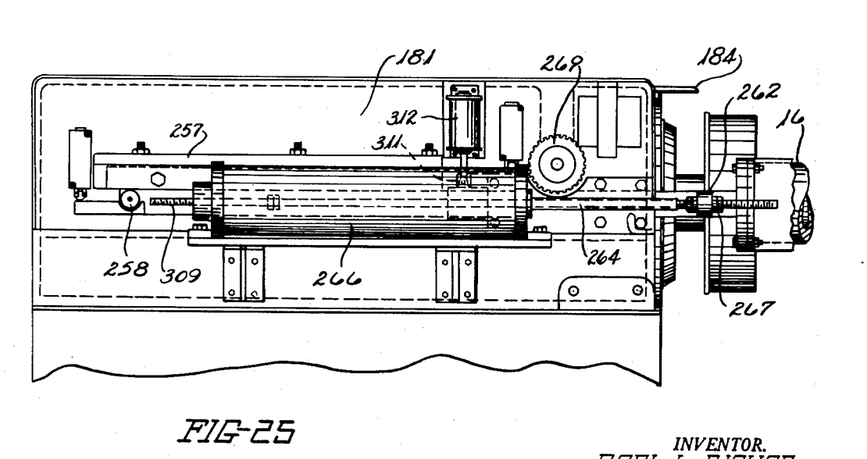
Figure 25 is a side elevation of the apparatus of Figure 24.
Figure 26:
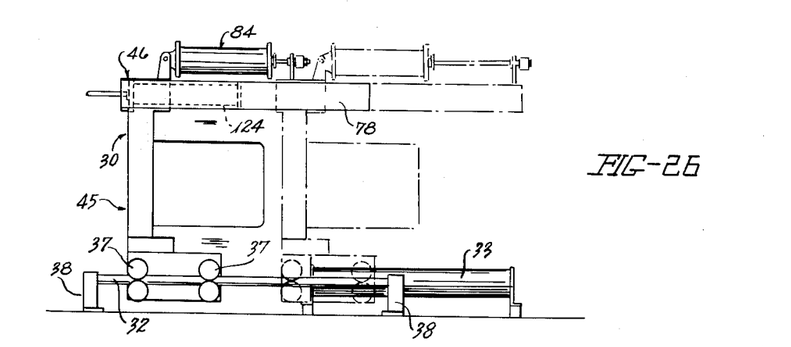
Figure 26 is a somewhat diagrammatic view of the portion of the right hand portion of the apparatus illustrating the manner of positioning the carriage of Figure 21, the dotted lines showing the fully retracted portion of the carriage.
Figure 27:
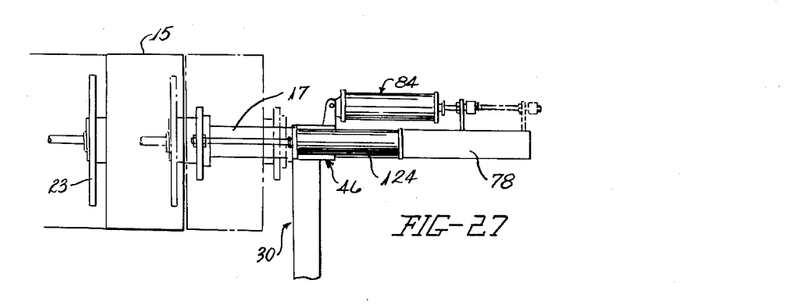
Figure 27 is a somewhat diagrammatic view illustrating the manner in which the outboard pullout plate is moved to its operative position under the bead of a tire.

As mentioned above, the assembly comprising the ply ring 14 and the bead ring 26 of the inboard apparatus are supported cantilever fashion by a pair of plates 206. The plates in turn are connected respectively to a pair of rack members 253 and 254, located at each side of the housing, see Figures 24 and 25. The racks have sliding movement within blocks 255 and 256 respectively, which are rigidly secured to the frame of the machine. In order to support the rack members against the weight of the apparatus, a pair of rails 257 are secured to the frame in a position to the rear of the blocks to extend above the rack members, for a considerable portion of their lengths. The rack members each have a roller 258 and 259 respectively, which roll against the lower surfaces of the rails. A similar arrangement is provided in the blocks 255 and 256 to permit free axial movement of the racks.

The racks are connected by T-shaped brackets 261 and 262 to the piston rods 263 and 264 of pneumatic motors 265 and 266 mounted on each side of the frame. The T-shaped brackets have axially extending bores through which the piston rods of the motors extend. The ends of the piston rods are threaded to receive the lock nuts 267 which are adapted to be brought into position to engage the brackets. To synchronize the movement of the rack members and thus insure that they will move together through every portion of the actuating strokes of the pneumatic motors, despite differences in friction, air pressure and the like, the rack members are positively linked together by means of a pair of pinions 268 and 269 respectively which are secured to a common shaft 281 extending laterally across the frame and mounted therein.

In order to transmit the actuating force of the twin motors 265 and 266 to the pullout plate, the main support ring is equipped with an air-actuated plunger indicated at 282, as shown in Figure 10. The plunger is operated by a pneumatic motor 280 which is adapted to move the plunger 282 into and out of engagement with a hole 283 in sleeve member 187.

When it is desired to move the pullout plate 22 axially to the right to its initial position of Figure 1, within the drum, the plunger 282 is first moved inwardly to its extended position, in which position it will extend up into the hole 283 of the sleeve member 187 on which the ply pullout plate is mounted. The pneumatic motors 265 and 266 are then actuated to force the complete assembly to the right along the tubular support 16, and in this movement, the plate 22 is carried to the right by the full stroke of the motors. It will be apparent that this arrangement is effective to move the plate 22 fully to the right toward the drum, or fully to the left. It cannot move the plate to the position beneath the beads of the tire which is necessary for the ply pullout operation. If it is desired to move the assembly of bead setting ring and ply ring, without changing the position of the pullout plate, the plunger 282 is kept in its fully retracted position.

Figures 14, 16, 17, 20:
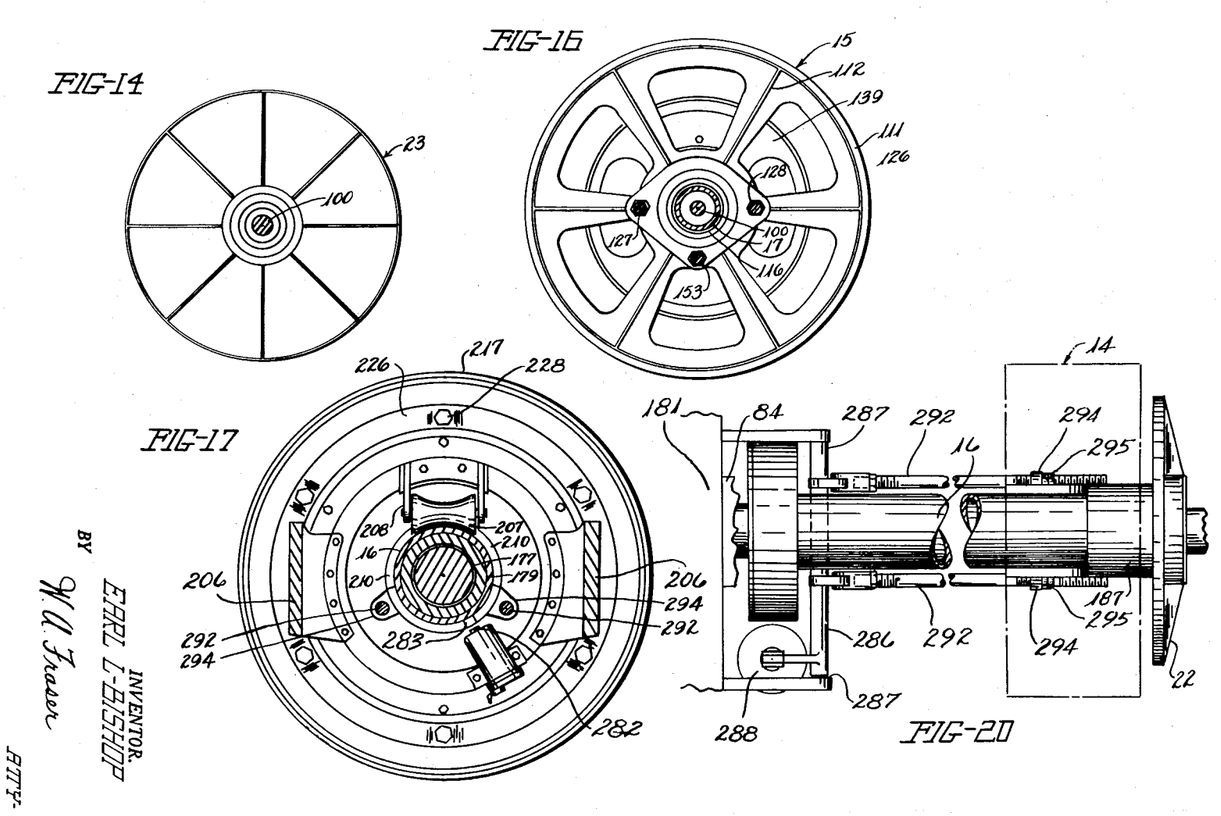
Figure 14 is an end elevation showing the pullout plate of Figure 12, the view being taken in the plane indicated by the line 14—14 of Figure 12.
Figure 16 is a sectional view showing an end elevation of the ply ring of Figure 12, the section being taken in the plane being indicated by the line 16—16 of Figure 12.
Figure 17 is a view partly in section showing the apparatus of Figure 10 in end elevation, the view being taken in the plane indicated by the line 17—17 of Figure 10.
Figure 20 is a fragmentary top plan view of the left hand portion of Figure 9 with portions of the apparatus removed to show, on an enlarged scale, the means for positioning the inboard pullout plate.
Figure 30:
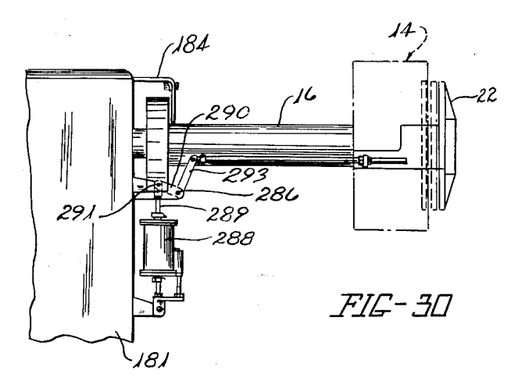
Figure 30 is a somewhat diagrammatic view, in side elevation of the apparatus of Figure 20, showing the means adapted to move the inboard pullout plate to successive operative positions.

In order to bring the pullout plate 22 leftwardly, away from the drum in the pullout operation, the apparatus best shown in Figure 20 and Figure 30, is provided. Essentially, this apparatus comprises a rocker shaft 286 pivoted to the frame as at 287, the shaft being given its rocking movement by a pneumatic motor 288 whose piston rod 289 is connected to the shaft through the rocker arm 290, the rocker arm being pivotally connected to the piston rod as at 291. A pair of rods 292 are connected to the rocker shaft 286 by the arms 293, the rods extending through a pair of lugs 294 integrally secured to the supporting sleeve member 187. The ends of the rods 292 are threaded and each have a nut 295 which are adapted to engage the end faces of the lugs 294 and pull the supporting sleeve 187 and pullout plate 22 leftwardly when the rocker shaft 286 is rotated. It will be appreciated that the pullout plate is positioned by the movement of the two pneumatic motors 265 and 266 which cause the pullout plate to travel to the right until the lugs 294 come close to the nuts 295 and then the rock shaft arrangement brings the pullout plate leftwardly back to the desired positions for pullout operation. These positions are determined by the angular position of the rock shaft 286 which is itself positioned by the piston rod of the pneumatic motor 288.

The positions of the pullout plate 22 for the inboard side of the apparatus, are thus determined by the four possible positions of the positioning motor 288, which are similar to the positions of the outboard end, already described.

One last feature of the construction, so far as the positioning of the inboard portion of the apparatus is concerned, should be mentioned. The rightward movement of the bead setting ring 26 is limited by an arrangement similar to that already described with respect to the outboard portion of the apparatus. When it is desired to hold the bead setting ring 26 out of contact with the tire, the forward stroke of the motors 265 and 266 is limited by a rod 309 shown in Figures 24–25 which extends rearwardly from the bracket 262. The rod has a pair of threaded nuts 310 which are adapted to engage the end face of a buffer block 311 just before the bead setting ring makes contact with the tire. Whenever it is desired to set the beads, the block 311 can be pulled back out of the path of the nuts 310 by a small pneumatic motor 312 and when this occurs the motors 265 and 266 will be able to make their full strokes and drive the bead setting ring into contact with the tire.

Operation

Now referring once again to the operation of the apparatus, the tire building operation is started by the operator pressing a button to energize a circuit and actuate solenoid valves which control the flow of air to the outboard motors 124 and 125 and the inboard motors 265 and 266 causing the ply rings 14 and 15 to move into contact with the building drum 10. In this position the buffer blocks 161 and 311 are in position to limit the movement of the rods 153 and 309 respectively and hence to limit the movement of the bead setting rings 26 and 27 so that the beads are held just out of contact with the tire.

At the same time the motor 280 is energized to move the pin 282 into coupled position with the sleeve 187 moving the pullout plate 22 fully within the drum and the motors 84 and 85 are also actuated to move pullout plate 23 into the drum. This is the position of the parts in Figure 1.

After the initial plies are laid upon the building drum and stitched together to form an endless band, the operator presses a second button and the proper solenoid valves are actuated to cause the motors 124 and 125, 265 and 266 to withdraw the ply rings and bead setting ring assemblies completely from the drum. However, the position of motors 84 and 85 remain unchanged at this step so that plate 23 remains within the drum, and the motor 280 is actuated to withdraw the plunger 282 from engagement with the sleeve 187 so that the inboard plate 22 also remains within the drum. This is the position of Figure 2.

The plies are then turned inwardly as shown in Figure 2 and the beads 24 and 25 are ready to be set. The ply ring and bead ring assemblies are once again moved inwardly towards the drum but at this time the buffer blocks 161 and 311 are retracted out of their operative blocking positions, by actuation of motors 164 and 312, respectively, and the inward movement of the bead setting rings is accordingly unrestricted so that the beads 24 and 25 are set in place against the tire plies with considerable force, see Figure 3. After the beads are set, the bead setting rings are withdrawn slightly and are then expanded by passing air into the tubes 151 and 251 respectively until the edges of the bead setting ring segments are approximately at the mean diameter of the beads. The bead setting rings are then once again moved inwardly into contact with the drum so that they engage the beads and hold them firmly against the shoulders of the drum, see Figure 4. At this time the motor 288 and the motors 84 and 85 respectively are actuated to bring the pullout plates 22 and 23 to the position of Figure 4 just within the beads. The outer diameters of the pullout plates are subsfantially equal to the inside diameter of the beads less the total thickness of plies which are pulled around the beads. These relative dimensions prevent pinching or scuffing of the plies as they are pulled axially out around the beads by the pullout plates, yet enable the plates to support the beads against shifting during the pullout operations.

Figure 7:
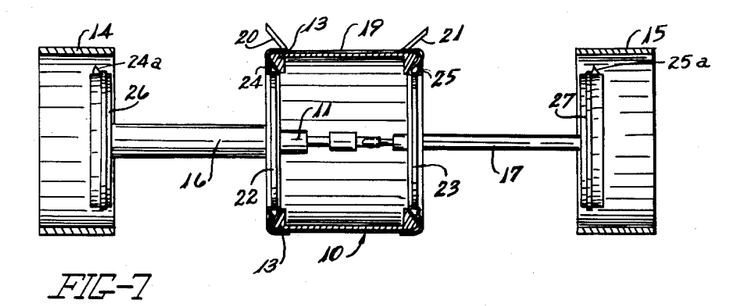

The tire building operation at this point has progressed to the step shown in Figure 5. The stitching discs 20 and 21 are brought inwardly into contact with the outer flat surfaces of the pullout plates. These outer plane surfaces are positioned in such a manner that the stitcher discs will ride upon and be guided by the surfaces onto the beads of the tire at the proper angle as the discs move radially outwardly in their stitching movement. To accomplish this, it is preferable, although not strictly necessary, that the stitcher discs be resiliently mounted. The stitcher mechanism of which the discs 20 and 21 are a part is not described in detail for it forms no part of the present invention. A suitable stitching mechanism is shown and described in detail in U. S. Patent 2,354,434 to Horace Stevens issued July 25, 1944. The stitching operation is completed as shown in Figure 7 while the pullout plates 22 and 23 are still positioned within their respective beads, thus holding the beads firmly against dislodgement during the stitching operation. After the stitching of the plies is completed the pullout plates are moved back into the drum. If a tire of double bead construction is to be built, the second beads 24a and 25a are moved manually from their positions of storage onto the notched edges of the bead setting rings, and essentially the same operation outlined above is followed for the second bead.

While a preferred form of the invention has been described it will be apparent that various modifications thereof will occur to those skilled in the art without departing from the spirit and scope of the invention, the essential features of which are summarized in the appended claims.

I claim:

1. In a tire building machine having a collapsible building drum supported and driven at the end of a cantilever shaft and having stitching means adapted to turn the tire plies extending axially beyond the ends of said drum radially around the tire beads located at the shoulders of the drum, apparatus located at each end of said drum including a pair of rings adapted to set the beads of said tire against the shoulders at each end of the drum after the tire plies extending beyond the ends of the drum have been turned radially inwardly by said stitching means, a pair of radial surfaces mounted co-axially with said drum, means to move said surfaces from their positions within the drum to positions immediately within the beads of said tire respectively, whereby to pull said inwardly turned plies outwardly into axially extending cylindrical form, means to expand said bead-setting rings and means to bring said expanded rings into position to bear against said beads to hold them in place against the shoulders of said drum while said surfaces are moved into position within said beads, and means to bring said stitching means to bear against said radial surfaces and to move radially outwardly from said surfaces over said beads whereby to stitch said out-turned, axially-extending plies radially outwardly around said beads.

2. In a tire building machine having a collapsible building drum supported and driven at the end of a cantilever shaft and having stitching means adapted to turn the tire plies extending axially beyond the ends of said drum radially around the tire beads located at the shoulders of the drum, apparatus located at each end of said drum including a pair of rings adapted to set the beads of said tire against the shoulders at each end of the drum after the tire plies extending beyond the ends of the drum have been turned radially inwardly by said stitching means, a pair of circular plates mounted co-axially with said rum, means to move said plates from their positions within the drum to positions immediately within the beads of said tire respectively, whereby to pull said inwardly turned plies outwardly into axially extending cylindrical form, means to expand said bead-setting rings and means to bring said expanded rings into position to bear against said beads to hold them in place against the shoulders of said drum while said plates are moved into position within said beads, and means to bring said stitching means to bear against the flat radial surfaces of said plates and to move radially outwardly from said plates over said beads whereby to stitch said out-turned, axially-extending plies radially outwardly around said beads.

3. In a tire building machine having a collapsible building drum supported and driven at the end of a cantilever shaft and having stitching means adapted to turn the tire plies extending axially beyond the ends of said drum radially around the tire beads located at the shoulders of said drum, apparatus located at each end of said drum including, respectively, means to set the beads of said tire against the shoulders at each end of the drum after the tire plies extending beyond the end of the drum have been turned radially inwardly by said stitching means, a pair of circular plates mounted co-axially with said drum, means to move said plates from their positions within the drum to positions immediately within the beads of said tire respectively, whereby to pull said inwardly turned plies outwardly into axially extending cylindrical form, means to hold said tire beads in place against the shoulders of said drum while said plates are moved into position within said beads, means to withdraw said bead-holding means, and means to bring said stitching means to bear against the radial surfaces of said plates and to move radially outwardly over said plates onto said beads whereby to stitch said out-turned, axially-extending plies radially outwardly around said beads.

4. In a tire building machine having a collapsible building drum supported and driven at the end of a cantilever shaft and having stitching means adapted to turn the tire plies extending axially beyond the ends of said drum radially around the tire beads located at the shoulders of said drum, apparatus located at each end of said drum including a pair of rings adapted to set the beads of said tire against the shoulders at each end of the drum after the tire plies extending beyond the end of the drum have been turned radially inwardly by said stitching means, means to pull said inwardly turned plies outwardly into axially extending cylindrical form, means to expand said bead-setting rings and means to bring said expanded rings into position to bear against said beads to hold them in place against the shoulders of said drum while said plies are turned axially outwardly, said ply pull-out means comprising a pair of plates mounted for axial movement toward and away from within said drum, said plates having circumferential surfaces adapted to fit snugly within the inside diameter of said beads to support said beads against dislodgment and having outer flat radial end surfaces means to bring said surfaces into alignment with the outside edges of said beads after said beads have been set against said inturned plies, and stitching means adapted to turn said plies from said cylindrical form radially around said beads, said radial surfaces comprising guides to direct said last-named stitching means onto said beads.

References Cited in the file of this patent

UNITED STATES PATENTS

| | | |
|---|---|---|
| 2,488,863 | Haase | Nov. 22, 1949 |
| 2,717,628 | Wikle et al. | Sept. 13, 1955 |